US006535944B1

(12) United States Patent
Johari et al.

(10) Patent No.: US 6,535,944 B1
(45) Date of Patent: Mar. 18, 2003

(54) HOT PLUG CONTROL OF MP BASED COMPUTER SYSTEM

(75) Inventors: Girish Chandra Johari, Austin, TX (US); Mark Wayne Mueller, Austin, TX (US); Peter Matthew Thomsen, Austin, TX (US); Lucinda Mae Walter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/281,082

(22) Filed: Mar. 30, 1999

(51) Int. Cl.[7] .................................................. G06F 1/00
(52) U.S. Cl. ..................... 710/302; 710/301; 710/304; 713/340; 713/330
(58) Field of Search ................................ 710/300–304, 710/311, 313, 314, 62–64, 72; 713/330–340

(56) References Cited

U.S. PATENT DOCUMENTS

| | | | | |
|---|---|---|---|---|
| 5,572,141 A | | 11/1996 | Hutton | |
| 5,712,754 A | * | 1/1998 | Sides et al. | 361/58 |
| 5,758,102 A | * | 5/1998 | Carey et al. | 710/302 |
| 5,784,576 A | * | 7/1998 | Guthrie et al. | 710/302 |
| 6,035,358 A | * | 3/2000 | Tanikawa | 710/301 |
| 6,038,633 A | | 3/2000 | Tavallaei | |
| 6,041,375 A | * | 3/2000 | Bass et al. | 710/302 |
| 6,044,424 A | * | 3/2000 | Amin | 710/302 |
| 6,108,732 A | * | 8/2000 | Klein | 710/302 |
| 6,138,195 A | * | 10/2000 | Bermingham et al. | 710/104 |
| 6,182,173 B1 | * | 1/2001 | Grosser et al. | 710/302 |
| 6,191,499 B1 | | 2/2001 | Severson et al. | |
| 6,209,051 B1 | * | 3/2001 | Hill et al. | 710/302 |
| 6,275,958 B1 | | 8/2001 | Carpenter et al. | |
| 6,282,596 B1 | * | 8/2001 | Bealkowski et al. | 710/302 |
| 6,286,066 B1 | | 9/2001 | Hayes et al. | |
| 6,289,467 B1 | * | 9/2001 | Lewis et al. | 713/340 |
| 6,338,107 B1 | * | 1/2002 | Neal et al. | 710/302 |

OTHER PUBLICATIONS

Atty. Docket No. AT9–98–835; U.S. patent application Ser. No. 09/281,081, Related Co–pending Application Girish Johari, et al., filed Mar. 30, 1999.

* cited by examiner

*Primary Examiner*—Peter Wong
*Assistant Examiner*—Raymond N Phan
(74) *Attorney, Agent, or Firm*—Bracewell & Patterson, LLP

(57) ABSTRACT

A method of servicing a computer system without interrupting operation of the computer system, by connecting a computer component to a board of the computer system, detecting connection of the computer component to the system board using a control circuit, supplying power to the voltage input of the computer component in response to detecting the connection, and thereafter monitoring the power supplied to the voltage input of the computer component. The method may be used for core computer components such as CPU modules and voltage regulator modules. Power to the voltage input of the computer component is turned off in response to a determination that a current level of the power supplied to the voltage input exceeds a specified level. A fault signal is latched in an active state in response to the determination; the fault signal is reset when the component is removed from the system. The method also applies to a plurality of hot-pluggable components, wherein the power supplied to each component is individually monitored.

11 Claims, 3 Drawing Sheets

HOT PLUG CONTROL OF MP BASED COMPUTER SYSTEM

BACKGROUND OF THE INVENTION

1. Field of the Invention

The present invention generally relates to computer systems, particularly to a method of upgrading or servicing computer components, and more specifically to a method of controlling voltage sources to computer components that are removed or added during operation of the computer system, i.e., without powering down the computer system or otherwise interrupting service.

2. Description of Related Art

Modern computing systems are often constructed from a number of processing units and a main memory, connected by a generalized interconnect. The basic structure of a conventional multi-processor computer system 10 is shown in FIG. 1. Computer system 10 has several processing units (CPUs) 12a, 12b, and 12c which are connected to various peripheral, or input/output (I/O) devices 14 (such as a display monitor, keyboard, and permanent storage device), memory device 16 (random-access memory or RAM) that is used by the processing units to carry out program instructions, and firmware 18 whose primary purpose is to seek out and load an operating system from one of the peripherals (usually the permanent memory device) whenever the computer is first turned on.

Processing units 12a–12c communicate with the peripheral devices, memory and firmware by various means, including a bus 20. Computer system 10 may have many additional components which are not shown, such as serial and parallel ports for connection to, e.g., modems or printers. Those skilled in the art will further appreciate there are other components that might be used in conjunction with those shown in the block diagram of FIG. 1; for example, a display adapter might be used to control a video-display monitor, a memory controller can be used to access memory 16, etc. The computer can also have more than three processing units. In a symmetric multi-processor (SMP) computer, all of the processing units 12a–12c are generally identical, that is, they all use a common set or subset of instructions and protocols to operate, and generally have the same architecture.

Conventional computer systems often allow the user to add or remove various components after delivery from the factory. For peripheral devices, this can be accomplished using an "expansion" bus, such as the Industry Standard Architecture (ISA) bus or the Peripheral Component Interconnect (PCI) bus. Another component that is commonly added by the user is main memory. This memory is often made up of a plurality of memory modules that can be added or removed as desired. Even processing units can be added or swapped out, in more recent computer designs.

Expansion buses such as the ISA and PCI buses were originally very limited, in that the entire computer system had to be powered down before any peripheral device could be added to or removed from a PCI adaptor slot, and then powered up again (rebooted) to properly initialize the operating system and any new peripheral device. More recently, computer hardware components such as "hot-pluggable" PCI adapters have been devised that can be added or removed from a computer system while the system is fully operational, without any service interruption. Each PCI adapter slot along the PCI bus has a separate power line, a separate reset line, and a switch connecting the slot to the bus, allowing the slot to be electrically isolated from the PCI bus, and reactivated after insertion of a new PCI device into the slot.

This hot-plug capability has never been expanded to core or low-level components such as processors, system memory, or voltage regulator modules (VRMs), which are used to produce the required power sources/references at precise voltages. While processors and system RAM can be added or swapped out in some conventional systems, these systems must still be powered down for such upgrades or service. Furthermore, components such as VRMs are generally not removable, and any replacement requires field service by a qualified engineer, since the VRM is hardwired into the system.

Unfortunately, a user may not only want to add another PCI device, but further might want to replace a defective processor, memory bank, or VRM, without service interruption. For many computer systems (particularly large servers used in a client-server network), there may be hundreds of users connected to it, and the down time required to perform such a service operation can be extremely expensive. Also, in systems which are used in mission-critical applications, it is highly desirable to be able to perform all maintenance or upgrade operations without service interruption, particularly when it is necessary to replace a defective component.

One problem in providing such hot-pluggable devices relates to control of the voltages and currents involved. Individual control must be maintained for the power characteristics of each hot-pluggable device, but presently available power supply designs are incapable of providing such control. Expanded hot-plug capabilities would also necessitate the generation appropriate status signals for other parts of the computer system, e.g., the firmware or operating system which supervises the hot-plug operations, in a manner heretofore not considered. It would, therefore, be desirable to provide a method of controlling the voltage sources to hot-pluggable devices in a computer system, to allow upgrading or servicing of system components without requiring a powering down or interruption of the system. It would be further advantageous if the method could easily handle a large number of hotpluggable devices, and monitor the devices for power faults.

SUMMARY OF THE INVENTION

It is therefore one object of the present invention to provide an improved method of upgrading and servicing components of a computer system.

It is another object of the present invention to provide such a method that allows a wide variety of computer components to be upgraded or serviced, without interrupting system operation.

It is yet another object of the present invention to provide such a method that carefully controls and monitors the power supplied to any such hot-pluggable devices, individually.

The foregoing objects are achieved in a method of servicing a computer system without interrupting operation of the computer system, generally comprising the steps of connecting at least one computer component to a board of the computer system, the computer component having a voltage input, detecting connection of the computer component to the system board using a control circuit of the computer system, supplying power to the voltage input of the computer component in response to said detecting step, and thereafter monitoring the power supplied to the voltage input of the computer component. The method may advantageously be used to provide for the removable interconnection (hot-plugging) of core computer components such as CPU modules and voltage regulator modules. The method may further include the step of turning off power to the voltage input of the computer component in response to a determination that a current level of the power supplied to the voltage input of the computer component exceeds a specified level. A fault signal is latched in an active state in response to the determination; the fault signal is reset when the component is removed from the system.

The method also applies to a plurality of hot-pluggable components, wherein the power supplied to each component is individually monitored. The control circuit can sequence power to the components in any desired order. A plurality of voltage good signals from the computer components are consolidated in the control circuit, and the control circuit generates a system power good signal based on the plurality of voltage good signals from the computer components.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
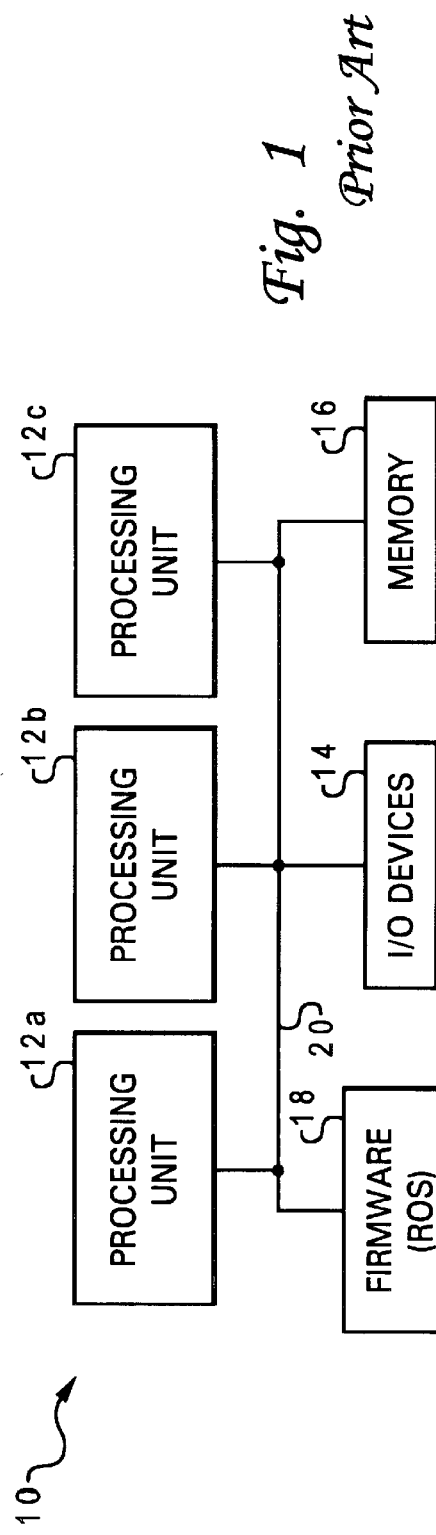
FIG. 1 is a block diagram of a prior-art multi-processor computer system.
Figure 2:
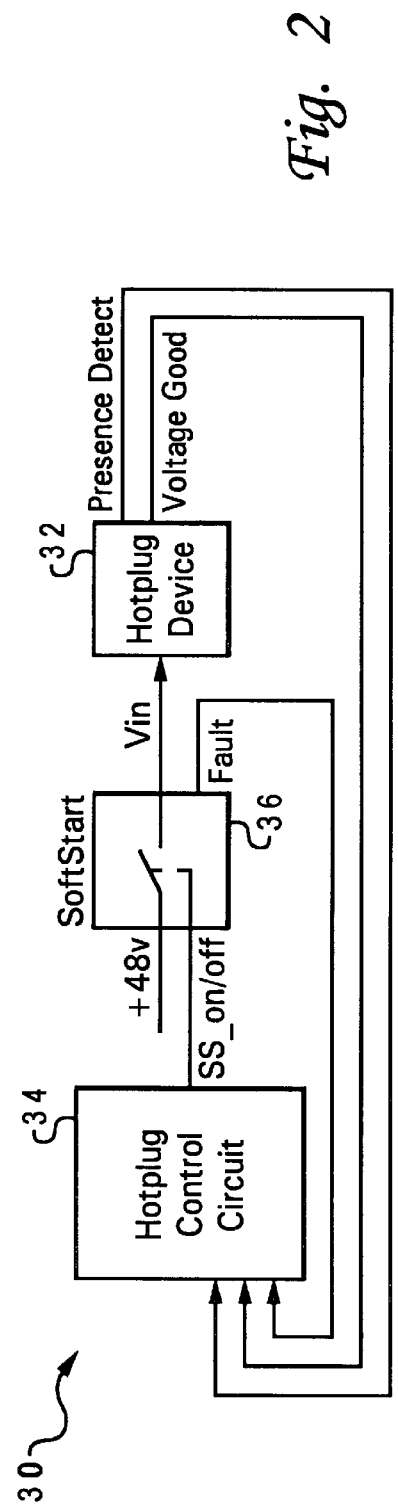
FIG. 2 is block diagram of a power subsystem for a computer system, illustrating the control and monitoring of one of a plurality of hot-pluggable devices used by the computer system, in accordance with one embodiment of the present invention.

With reference now to the figures, and in particular with reference to FIG. 2, there is depicted one embodiment of a power subsystem 30 constructed in accordance with the present invention, for a computer system having a plurality of hot-pluggable devices. FIG. 2 depicts only one such hot-pluggable device 32, but it is understood that the following description applies to any number of hot-pluggable devices that may be provided by the overall computer architecture.

While the present invention may be applied to hot-plug peripheral devices, it is particularly adapted for use with non-peripheral components, such as the central processing units (CPUs or processors), or even lower-level components like a voltage regulator module (VRM). These components may be rendered hot-pluggable as described in U.S. Pat. applications Ser. Nos. 09/281,080 and 09/281,081, which are hereby incorporated. The CPUs and VRMs may be added or removed using connectors mounted on a system board.

In this embodiment, power subsystem 30 includes a single hotplug control circuit 34, and individual soft start circuits 36 (one for each hot-pluggable device 32). Prior to a device being connected, soft start circuit 36 is off, resulting in no input voltage ($V_{in}$) to device 32. When the device is placed in a corresponding slot or socket, the "Presence Detect" signal output from device 32 becomes active. The Presence Detect line has a pull-down resistor to ground on the hotpluggable device. The signal floats when the device is not present, and is grounded when the device is present. Once hotplug control circuit 34 detects the presence of device 32, it enables soft start circuit 36, which turns on $V_{in}$ to hotplug device 32. Soft start circuit 36 is described further below.

Figure 3:
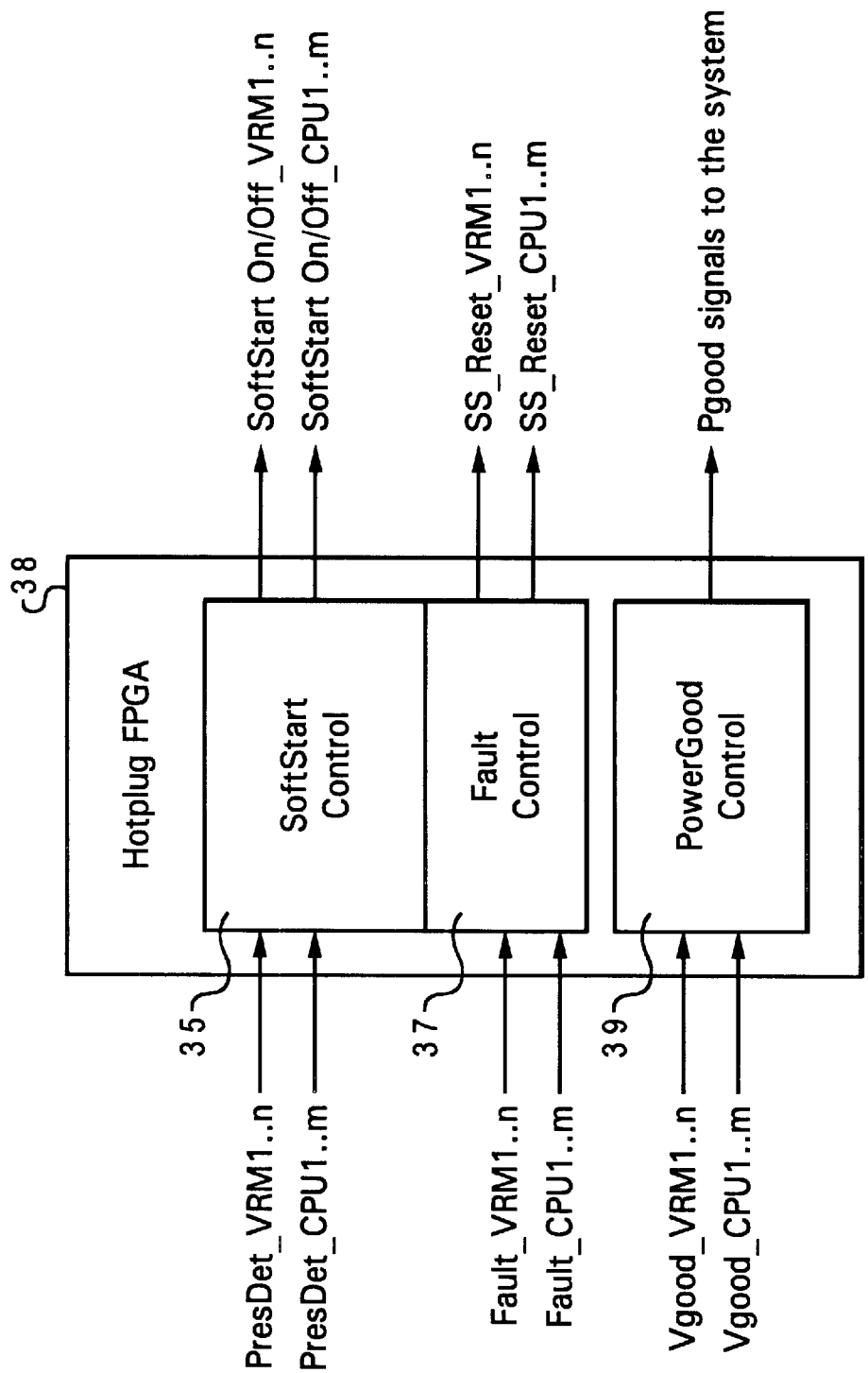
FIG. 3 is a pictorial representation of one implementation of a field programmable gate array used with the hot-plug control circuit of FIG. 2.

As noted, only one hotplug control circuit 34 is provided in this embodiment, but it is adapted to handle multiple hot-pluggable devices (17 devices in the example discussed in conjunction with FIG. 3). Hotplug control circuit 34 can sequence the voltage to the devices in any desired (predefined) order. Hotplug control circuit 34 also monitors soft start circuit 36 for faults via a "Fault" signal. If a fault is detected, hotplug control circuit 34 shuts off soft start circuit 36.

In the illustrative embodiment, hotplug control circuit 34 is implemented with a field programmable gate array (FPGA). FIG. 3 shows a detailed plan of a hotplug control FPGA 38 configured in accordance with the present invention. Hotplug control FPGA 38 is adapted for use with hot-pluggable VRMs, hot-pluggable CPU modules, etc. A plurality of Presence Detect signals are input into the soft start control logic 35, which has as its outputs a plurality of respective soft start on/off lines. A plurality of fault signals are similarly input into the fault control logic 37, which has as its outputs a plurality of respective reset lines. The voltage good signals from each hot-pluggable VRM or CPU quad are respectively consolidated in power good control logic 39, which generates the Power Good signals for the rest of the system.

Figure 4:
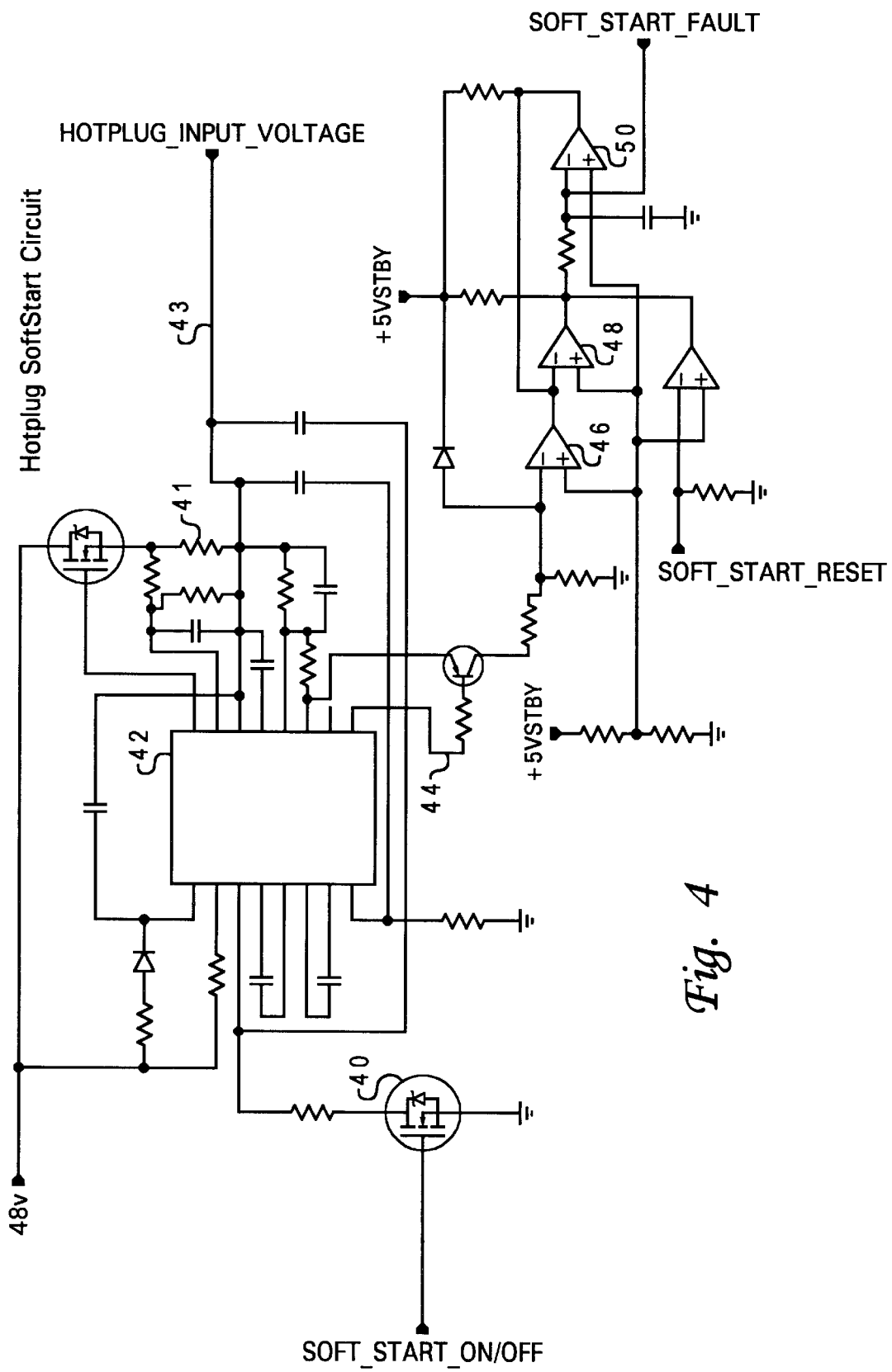
FIG. 4 is a schematic diagram of a soft start circuit used to supply power to a hot-pluggable device, in accordance with one embodiment of the present invention.

FIG. 4 depicts one embodiment of soft start circuit 36. The SOFT_STARTON/OFF signal is an LVTTL (low-voltage transistor-transistor logic) level signal that enables a power MOSFET 40 to smoothly bring the HOTPLUG$_{13}$INPUT_VOLTAGE signal up to the input voltage supplied to the circuit. In example, the input voltage is 48 volts, provided by a power supply (not shown) connected to an external power source, e.g., a 110 volt AC wall outlet.

A logic circuit 42 (Unitrode part# UCC3917) provides a fault output 44 if the voltage across the current sense resistor 41 exceeds a specified level (e.g., 50 mV). Several comparators 46, 48 and 50 latch the fault signal, and keep it high (active) until the SOFT_START_RESET signal allows it to be reset. As long as the fault signal is active, hotplug control circuit 34 maintains the SOFT_START_ON/OFF signal at the low level to keep the power HOTPLUG INPUT VOLTAGE 43 turned off. The reset signal can be activated upon, e.g., removal of the device which is also detected via the Presence Detect signal.

Pins C1P and C1N of the Unitrode part are connected to an upper charge pump capacitor, while pins C2P and C2N are connected to a lower charge pump capacitor. Pin OUTPUT is the output to the NMOS pass element, and pin SENSE is the sense voltage input from sense resistor 41. The capacitor value on pin CT determines the maximum fault time before retrying; this retry feature is disabled in the illustrated embodiment by the SOFT_START_RESET circuitry. The resistance on pin MAXI determines the maximum allowable sourcing current. Pin FLTOUT# is used for fault output indication. The reference signals include pin $v_{ss}$ (the negative reference for the device), pin $V_{OUT}$ (the ground reference for the chip, which is floating with respect to system ground), and $V_{REF}$/CATFLT# (the output reference for programming MAXI, and catastrophic fault output).

Those skilled in the art will appreciate that the present invention provides an effective method of individually controlling voltage sources to hot-pluggable devices. The invention thus makes it possible (and convenient) to use components such as CPU modules and VRMs as hot-pluggable devices. The invention is also scalable to practically any number of hot-pluggable devices since the FPGA is easily modified.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of servicing a computer system without interrupting operation of the computer system, comprising the steps of:

connecting at least one computer component to a board of the computer system, the computer component having a voltage input;

detecting connection of the computer component to the system board using a control circuit of the computer system;

supplying power to the voltage input of the computer component in response to said detecting step;

monitoring the power supplied to the voltage input of the computer component;

determining that a current level of the power supplied to the voltage input of the computer component exceeds a specified level;

turning off power to the voltage input of the computer component in response to said determining step;

latching a fault signal in active state in response to said determining step;

detecting removal of the computer component; and removing the computer component from the system board;

resetting the fault signal in response to said of detecting removal of the computer component.

2. The method of claim 1 wherein said connecting step connects a CPU module to the system board.

3. The method of claim 1 wherein said connecting step connects a voltage regulator module to the system board.

4. A method of servicing a computer system without interrupting operation of the computer system, comprising the steps of:

connecting a plurality of computer components to the system board, each component having a voltage input;

detecting connection of each of the computer components to the system board using the control circuit;

supplying power to the respective voltage inputs of each of the computer components in response to detection of a given connection;

monitoring power supplied to each of the voltage inputs of the computer components; and wherein the control circuit sequences power to the components in a pre-defined order.

5. A method of servicing a computer system without interrupting operation of the computer system, comprising the steps of:

connecting a plurality of computer components to the system board, each component having a voltage input;

detecting connection of each of the computer components to the system board using the control circuit;

supplying power to the respective voltage inputs of each of the computer components in response to detection of a given connection;

monitoring power supplied to each of the voltage inputs of the computer components;

consolidating a plurality of voltage good signals from the computer components, in the control circuit; and generating a system power good signal using the control circuit based on the plurality of voltage good signals from the computer components.

6. The method of claim 5 further comprising the steps of:

determining that a current level of the power supplied to the voltage input of a given computer component exceeds a specified level; and turning off power to the voltage input of the given computer component in response to said determining step.

7. A power subsystem for a computer system, comprising:

a circuit board having at least one connector for receiving a component of the computer system, said computer component having a voltage input;

means for detecting connection of the computer component to said circuit board;

means for supplying power to the voltage input of the computer component in response to detection of the connection wherein said supplying means includes a control circuit having a field programmable gate array; and means for monitoring the power supplied to the voltage input of the computer component.

8. A power subsystem for a computer system comprising:

a circuit board having at least one connector for receiving a component of the computer system, said computer component having a voltage input;

means for detecting connection of the computer component to said circuit board;

means for supplying power to the voltage input of the computer component in response to detection of the connection;

means for monitoring the power supplied to the voltage input of the computer component;

means for turning off power to the voltage input of the computer component in response to a determination that a current level of the power supplied to the voltage input of the computer component exceeds a specified level;

means for latching a fault signal in an active state in response to the determination that the current level exceeds a specified level; and means for resetting the fault signal in response to detecting that the computer component has been removed from the circuit board.

9. A power subsystem for a computer system, comprising:

a circuit board having at least one connector for receiving a component of the computer system, said computer component having a voltage input;

means for detecting connection of the computer component to said circuit board;

means for supplying power to the voltage input of the computer component in response to detection of the connection; and means for monitoring the power supplied to the voltage input of the computer component; wherein:

said circuit board has a plurality of connectors for respectively receiving a plurality of computer components, each component having a voltage input;

said detecting means detects connection of each of the computer components to the circuit board;

said supplying means supplies power to the respective voltage inputs of each of the computer components in response to detection of a given connection, and wherein said supplying means sequences power to the components in a pre-defined order; and said monitoring means individually monitors power supplied to each of the voltage inputs of the computer components.

10. A power subsystem for a computer system, comprising:

a circuit board having at least one connector for receiving a component of the computer system, said computer component having a voltage input;

means for detecting connection of the computer component to said circuit board;

means for supplying power to the voltage input of the computer component in response to detection of the connection;

means for monitoring the power supplied to the voltage input of the computer component; wherein:

said circuit board has a plurality of connectors for respectively receiving a plurality of computer components, each component having a voltage input;

said detecting means detects connection of each of the computer components to the circuit board;

said supplying means supplies power to the respective voltage inputs of each of the computer components in response to detection of a given connection; and said monitoring means individually monitors power supplied to each of the voltage input of the computer components means for consolidating a plurality of voltage good signals from the computer components; and means for generating a system power good signal based on the plurality of voltage good signals from the computer components.

11. A device comprising:

a circuit board having a plurality of connectors for receiving respective components of the computer system, said computer components having voltage inputs;

means for detecting connection of a given one of the computer components to said circuit board;

a control circuit having a field programmable gate array supplying power to the voltage input of the given computer component in response to detection of the connection;

means for monitoring the power supplied to the voltage input of the given computer component;

means for turning off power to the voltage input of the given computer component in response to a determination that a current level of the power supplied to the voltage input of the given computer component exceeds a specified level;

means for latching a fault signal in an active state in response to the determination that the current level exceeds the specified level; and means for resetting the fault signal in response to detecting that the computer component has been removed from the circuit board.

* * * * *